United States Patent
Oda et al.

(10) Patent No.: US 7,097,900 B2
(45) Date of Patent: Aug. 29, 2006

(54) SHEET AND ELECTRONIC COMPONENT PACKAGING CONTAINER

(75) Inventors: Minoru Oda, Isezaki (JP); Katsuhisa Ogita, Isezaki (JP); Takeshi Miyakawa, Isezaki (JP); Tetsuo Fujimura, Isezaki (JP); Mikio Shimizu, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/343,308

(22) PCT Filed: Jun. 14, 2002

(86) PCT No.: PCT/JP02/05971

§ 371 (c)(1),
(2), (4) Date: Jan. 30, 2003

(87) PCT Pub. No.: WO03/106165

PCT Pub. Date: Dec. 24, 2003

(65) Prior Publication Data

US 2004/0005465 A1 Jan. 8, 2004

(51) Int. Cl.
*B32B 27/18* (2006.01)
*B32B 27/30* (2006.01)
*B32B 27/32* (2006.01)
*B32B 33/00* (2006.01)
*B65D 85/00* (2006.01)

(52) U.S. Cl. .................. 428/212; 428/336; 428/412; 428/421; 428/500; 428/522; 428/523; 206/709; 206/713; 206/719

(58) Field of Classification Search ............ 206/706, 206/709, 713, 719, 720, 721; 524/910; 428/212, 428/411.1, 412, 421, 500, 522, 523, 336
See application file for complete search history.

(56) References Cited

U.S. PATENT DOCUMENTS 4,658,958 A * 4/1987 McNulty et al. ............ 206/720

(Continued)

FOREIGN PATENT DOCUMENTS

| JP | 61235138 | 10/1986 |
| JP | 62-183776 | 7/1987 |
| JP | 63-299923 | 12/1988 |
| JP | 7-214739 | 8/1995 |
| JP | 10329278 | 12/1998 |
| JP | 2000318080 | 11/2000 |
| JP | 2001-202828 | 7/2001 |
| WO | 01/12708 | 2/2001 |

OTHER PUBLICATIONS

Reference No. A093180, Dispatch No. 044206, Japanese Official Action JP Patent Application No. 2001–027822 dated Feb. 6, 2004 with English Translation.

(Continued)

*Primary Examiner*—Ramsey Zacharia
(74) *Attorney, Agent, or Firm*—Oblon, Spivak, McClelland, Maier & Neustadt, P.C.

(57) ABSTRACT

In order to prevent static electricity impairment of an electronic component, a layer at the surface of a container to be in contact with an electronic component is one having a relatively high surface resistivity, a layer having a higher electrical conductivity than that is laminated below it, and the surface resistivity of the layer at the surface is higher than that of the layer below it. It is considered that in an electronic component packaging container having such a constitution, static electricity electrified on an electronic component is gradually discharged from the electronic component to the surface of the electronic component packaging container without sudden discharge, thus preventing the static electricity impairment. The surface layer preferably comprises a material close to the electronic component in the series of frictional electrification.

24 Claims, 1 Drawing Sheet

U.S. PATENT DOCUMENTS

| | | | | |
|---|---|---|---|---|
| 4,687,801 A | * | 8/1987 | Mitani et al. | 524/104 |
| 4,699,830 A | | 10/1987 | White | |
| 4,971,196 A | * | 11/1990 | Kitamura et al. | 206/204 |
| 5,097,949 A | * | 3/1992 | Heldwein | 206/720 |
| 5,110,669 A | * | 5/1992 | Knobel et al. | 428/215 |
| 5,308,894 A | * | 5/1994 | Laughner | 523/436 |
| 5,348,995 A | * | 9/1994 | Anderson | 524/157 |
| 6,730,401 B1 | * | 5/2004 | Jackson et al. | 428/411.1 |

OTHER PUBLICATIONS

Reference No. A093180, Dispatch No. 168785, Japanese Official Action JP Application No. 2001–027822 dated May 11, 2004 with English Translation.

* cited by examiner

Fig. 1

SHEET AND ELECTRONIC COMPONENT PACKAGING CONTAINER

TECHNICAL FIELD

The present invention relates to a sheet for an electronic component packaging container and a carrier tape, and an electronic component packaging container employing it.

BACKGROUND ART

As packaging forms of electronic components such as IC, an injection tray, a vacuum-formed tray, a magazine, a carrier tape (embossed carrier tape), etc., may be mentioned. An electronic component packaging container is used for e.g. transport or storage of electronic components. A container having a surface resistivity of from $10^4$ to $10^8$ $\Omega/cm^2$ prevents static electricity destruction of an electronic component since generated static electricity is likely to go away by earthing of the container. In order that the surface resistivity is within the above range, a method of coating an antistatic agent on the surface of the packaging container, a method of coating an electrically conducive coating, a method of dispersing an antistatic agent or a method of dispersing an electrically conductive filler may, for example, be known (JP-A-57-78439).

Among them, a method of dispersing an electrically conductive filler has been commonly used. As the electrically conductive filler, a metal fine powder, carbon fibers, carbon black, etc. have been known (JP-A-60-8362). It is possible to uniformly disperse carbon black, whereby a stable surface resistivity is easily obtained. As a resin in which the carbon black is dispersed, a thermoplastic resin is employed. For example, a polyvinyl chloride type resin, a polypropylene type resin, a polyethylene terephthalate type resin, a polystyrene type resin, an ABS type resin, a polyphenylene ether type resin or a polycarbonate resin may be mentioned. A polystyrene type resin and a polyphenylene ether type resin are excellent respectively for general use and for heat resistance use, since their fluidity and moldability do not significantly decrease even when a large amount of carbon black is added, as compared with other resins, and in view of cost also.

When the surface resistivity of e.g. an electronic component packaging container is within a range of from $10^4$ to $10^8$ $\Omega/\square$, static electricity impairment may be prevented but can not completely be prevented. As wiring in an electronic component becomes fine along with high integration of the electronic component, the electronic component is more likely to be susceptible to static electricity destruction. Even in an electronic component packaging container having a surface resistivity of from $10^4$ to $10^8$ $\Omega/\square$, destruction of an electronic component may be caused by discharge of static electricity generated on an electronic component by friction between the electronic component and the container or by induction from another electrified substance into the electronic component packaging container in some cases. The reason of the destruction of an electronic component by static electricity is considered to be an instantaneous increase in temperature in the inside of an electronic component along with discharge from the electronic component to the surface of the electronic component packaging container in a very short period of time.

DISCLOSURE OF THE INVENTION

In order to prevent static electricity impairment of an electronic component, a layer at the surface of a container to be in contact with an electronic component should be one having a relatively high surface resistivity, and a layer having more electrical conductivity than that should be laminated below it, and the surface resistivity of the layer at the surface should be higher than that of the electrically conductive layer below it. In the electronic component packaging container having such a constitution, static electricity electrified on the electronic component is gradually discharged from the electronic component to the surface of the electronic component packaging container without sudden discharge, and such is considered to prevent the static electricity impairment.

The surface resistivity of the layer at the surface to be in contact with an electronic component (hereinafter referred to as "surface layer") must be higher than that of a layer to be laminated below it (hereinafter referred to as "electrically conductive layer"). The surface resistivity of the electrically conductive layer is within a range of from $10^2$ to $10^{12}$ $\Omega/\square$, preferably from $10^4$ to $10^{10}$ $\Omega/\square$, more preferably from $10^4$ to $10^8$ $\Omega/\square$. The surface resistivity of the surface layer is usually selected from $10^9$ to $10^{14}$ $\Omega/\square$, but it may be higher than that if a thermoplastic resin is used for the surface layer. If the surface resistivity of the surface layer is higher than $10^{14}$ $\Omega/\square$, the thickness of the surface layer is preferably at most 20 μm, particularly preferably within a range of from 0.1 to 20 μm. Further, the surface layer is preferably formed by a material which is close to an electronic component to be contained therein in the series of frictional electrification.

BEST MODE FOR CARRYING OUT THE INVENTION

Constitution

Specific constitutions of an electronic component packaging container and a sheet used therefor include, for example, a constitution comprising surface layer/electrically conductive layer, a constitution comprising surface layer/electrically conductive layer/surface layer, and constitutions comprising surface layer/electrically conductive layer/substrate layer, and surface layer/electrically conductive layer/substrate layer/electrically conductive layer/surface layer, having a substrate layer added. The constitution of the electronic component packaging container and the sheet is not limited thereto so long as it comprises an electrically conductive layer and a surface layer. The electrically conductive layer and the surface layer are laminated preferably directly, but another layer such as a layer having an electrical conductivity intermediate between those of the electrically conductive layer and the surface layer, may further be formed between the electrically conductive layer and the surface layer.

Electrically Conductive Layer

The surface resistivity of the electrically conductive layer is from $10^2$ to $10^{12}$ $\Omega/\square$, preferably from $10^4$ to $10^{10}$ $\Omega/\square$, more preferably from $10^4$ to $10^8$ $\Omega/\square$. In the present invention, the surface resistivity is a resistance per unit surface area, and is defined in JIS K-6911.

The electrically conductive layer contains a thermoplastic resin and an electrically conductive filler. As the thermoplastic resin, a polystyrene type resin containing, as the main component, GPPS (general purpose polystyrene) or HIPS (high-impact polystyrene) or a mixture thereof, a polyolefin type resin containing, as the main component, a homopolymer of ethylene or propylene or a copolymer consisting mainly of ethylene or propylene, a polycarbonate type resin, an ABS type resin containing, as the main component, a copolymer consisting mainly of three components of acrylonitrile-butadiene-styrene, an acryl type resin containing, as the main component, a polyacrylic acid or a polyacrylate such as polymethyl acrylate, a polyamide type resin containing polyamide as the main component, a polyester type resin containing polyester as the main component, a polyurethane type resin containing polyurethane as the main component, polyphenylene ether and their alloy type resins may, for example, be used.

In order to impart electrical conductivity to the thermoplastic resin, an electrically conductive filler such as carbon fibers, metal fibers, a metal powder or carbon black may be added. Carbon black is a preferred electrically conductive filler. As the carbon black, furnace black, channel black, acetylene black, etc. may be used. The electrically conductive filler is added so that the surface resistivity of the electrically conductive layer will be from $10^2$ to $10^{12}$ $\Omega/\square$, preferably from $10^4$ to $10^{10}$ $\Omega/\square$, more preferably from $10^4$ to $10^8$ $\Omega/\square$. The addition amount varies depending upon the carbon black, but is from about 5 to about 50 parts by weight based on 100 parts by weight of the thermoplastic resin.

The electrically conductive layer must have a surface resistivity lower than that of the surface layer.

Surface Layer

The surface layer has a surface resistivity higher than that of the electrically conductive layer. The surface resistivity of the surface layer may be within a range of from $10^9$ to $10^{14}$ $\Omega/\square$, or it may be higher than that.

The surface layer preferably contains a resin. For example, a resin containing an antistatic agent is laminated on the surface of the electrically conductive layer by a known method such as a multilayer co-extrusion method, a coating method or a laminate method to obtain a surface layer.

The antistatic agent may, for example, be a silicon type compound antistatic agent, a surfactant such as a group of compounds having a sulfonic acid group, or a polymer type antistatic agent such as a polyether amide type copolymer or a vinyl type copolymer being hydrophilic and containing an ionic group. It is also possible to employ a polymer type antistatic agent or an electrically conductive resin such as polyaniline, polypyrrole, polythiophene, polyacrylonitrile, polyperinaphthalene or polyacetylene for the surface layer so long as the surface resistivity is within a range of from $10^9$ to $10^{14}$ $\Omega/\square$. Further, an electrically conductive filler may be incorporated into the resin.

It is possible to use a thermoplastic resin as the resin used as the surface layer, and a polystyrene type resin containing, as the main component, a general purpose polystyrene resin (GPPS) or a high-impact polystyrene resin (HIPS) or a mixture thereof, a polyolefin type resin containing, as the main component, a homopolymer of ethylene or propylene or a copolymer consisting mainly of ethylene or propylene, a polycarbonate type resin, an ABS type resin containing, as the main component, a copolymer consisting mainly of three components of acrylonitrile-butadiene-styrene, an acryl type resin containing, as the main component, a polyacrylic acid or a polyacrylate such as polymethyl acrylate, a polyamide type resin containing polyamide such as 6-nylon as the main component, a polyester type resin containing polyester as the main component, a polyurethane type resin containing polyurethane as the main component and their alloy type resins may, for example, be used.

The surface layer is preferably close to an electronic component to be contained, in the series of frictional electrification. It is considered that the amount of the charge generated on the electronic component due to friction with the electronic component container can be reduced in such a case. This is suitable for an electronic component which is susceptible to impairment due to static electricity, such as IC.

Figure 1:
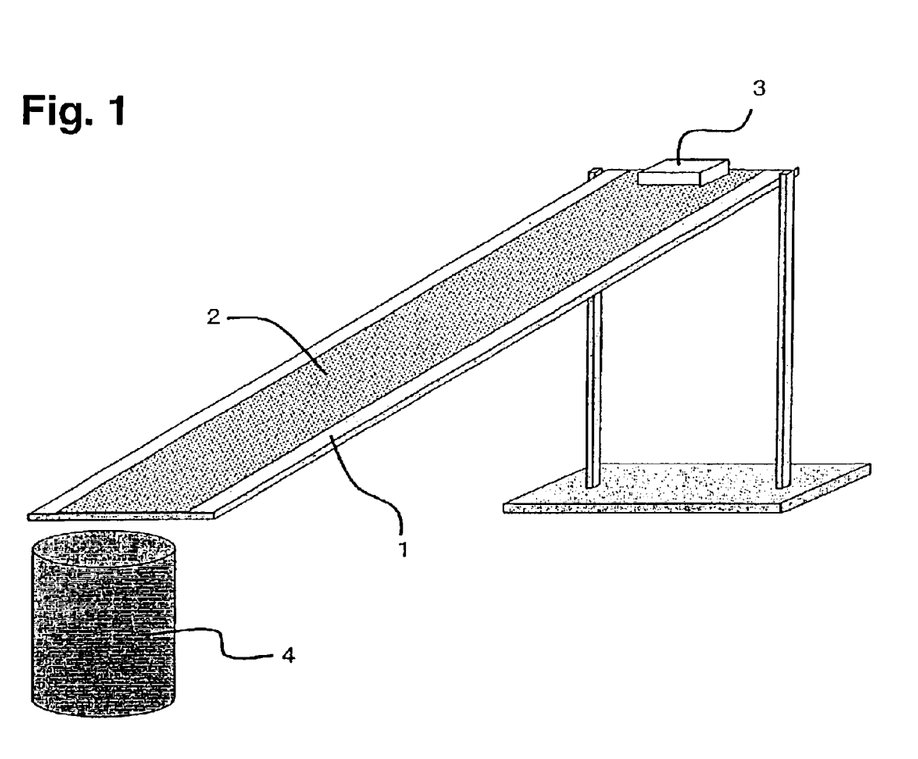
FIG. 1 illustrates a test apparatus used when the static electrification charge amount generated on an IC is measured from static electrification amounts of a sheet and the IC. Numerical reference 1 designates a slope, numerical reference 2 designates a sheet for measurement of the static electrification amount, numerical reference 3 designates an IC, and numerical reference 4 designates a Faraday cage.

As a means to measure the series of frictional electrification, a method may be mentioned wherein a slope at an inclination angle of 30 degrees with a slope length of 30 cm is made by using a film having the same composition as that of the surface layer as shown in FIG. 1, the charge on the film is destaticized by ionized air or a water-soluble organic solvent such as an alcohol or acetone, and then an IC destaticized with ionized air or a water-soluble organic solvent such as an alcohol or acetone is slid down from the upper part of the slope, and the charge amount generated on the IC is measured by a Faraday cage. At this time, when the absolute value of the charge amount generated on the IC is at most 1 nC, it can be considered that the film constituting the slope and the IC are close in the series of frictional electrification. The absolute value of the charge amount is preferably as low as possible.

As the resin constituting the surface layer, preferred is a thermoplastic resin alloy comprising a mixture of an acrylate type polymer with polyvinylidene fluoride, which can easily adjust the series of frictional electrification. The acrylate type polymer and the vinylidene fluoride can easily be mixed. Further, both resins are greatly different in the series of frictional electrification, and accordingly resin compositions which are different in the series of frictional electrification can be obtained by changing the mixture ratio.

Similarly, when a mixture of an olefin type polymer with an aromatic vinyl compound type polymer or a mixture of polycarbonate with a copolymer of acrylonitrile with an aromatic vinyl compound type polymer is used, the series of frictional electrification can be adjusted by changing the proportion of the components contained. A resin comprising an olefin type polymer as the main chain and an aromatic vinyl compound type polymer grafted to the main chain or on the contrary, a polymer comprising an aromatic vinyl compound type polymer as the main chain and an olefin type polymer grafted to the main chain may also be used preferably.

Substrate Layer

The substrate layer comprises a single layer or a multi-layer thermoplastic resin. To the thermoplastic resin, various processing aids such as a filler, a reinforcing material, a modifying agent, a plasticizer and an antioxidant may be added. As the thermoplastic resin used for the substrate layer, a polystyrene type resin, a polyolefin type resin, a polycarbonate type resin, an ABS type resin, a polyester type resin, a polyphenylene ether type resin, an acryl type resin, a polyamide type resin, a polyurethane type resin and their alloy type resins may be used.

Film Thickness

The film thickness (thickness) of the sheet or the electronic component packaging container is preferably from 0.1 to 5 mm. The thickness of the surface layer is preferably at most 20 μm if the surface resistivity of the surface layer exceeds $10^{14}$ $\Omega/\square$, more preferably at most 10 μm. When the surface resistivity of the surface layer is at most $10^{14}$ Ω/□, the thickness of the surface layer is not particularly limited but is preferably at most 200 μm, more preferably at most 100 μm. In a case where a substrate layer is formed in addition to the surface layer and the electrically conductive layer, the thickness of the substrate layer in the total film thickness of the electrically conductive layer and the substrate layer is preferably at least 20%.

Production Process

In the present invention, the process for producing the sheet is not particularly limited. For example, blended compounds comprising a thermoplastic resin, an electrically conductive filler and an antistatic agent or an electrically conductive resin, to be the surface layer and the electrically conductive layer, are respectively kneaded by various kneading machines such as a twin screw extruder and a continuous kneading machine and pelletized. Then, using a plurality of extruders, the pellets of the resins for the substrate layer, the electrically conductive layer and the surface layer are respectively supplied to the extruders, followed by lamination by means of a multilayer co-extrusion forming method such as a feed block method or a multi-manifold method to produce a sheet.

Further, production of a sheet by a method of successively coating and laminating an electrically conductive layer and a surface layer on a substrate layer formed by using an extruder or a method of coating a surface layer on an electrically conducive layer sheet formed by using a extruder, followed by lamination, is possible.

Application

The sheet can be used for an electronic component packaging container. The electronic component packaging container is a container for an electronic component such as an IC, a LED, a resistor, a capacitor, an inductor, a transistor, a diode, etc. The sheet is suitable for an IC which is particularly susceptible to static electricity impairment. The sheet may be subjected to vacuum forming, air-pressure forming or hot plate forming to produce an electronic component packaging container in a packaging form of e.g. a vacuum-formed tray, a magazine tube or a carrier type (embossed carrier tape).

EXAMPLE 1

Acetylene black (DENKA BLACK particulate, Denki Kagaku Kogyo K.K.) in a proportion of 24 parts by weight based on 100 parts by weight of HIPS (HI-E4, Toyo Styrene K.K.) was measured, and they were uniformly mixed by using a high speed kneading machine, then kneaded by using a ϕ45 mm vent type twin screw extruder and pelletized by means of a strand cut method to obtain a resin composition to constitute an electrically conductive layer.

Using an ABS resin (GR-2000, Denki Kagaku Kogyo K.K.) for a substrate layer, lamination was carried out by means of a feed block method using a ϕ65 mm extruder (L/D=28) and a T-die to obtain a three-layer sheet comprising electrically conductive layer/substrate layer/electrically conductive layer having an entire film thickness of 0.3 mm. The surface resistivity of the electrically conducive layer in this three-layer sheet was $1.5 \times 10^6$ Ω/□.

On one side of this sheet, a soluble electrically conductive resin (solvent water/alcohol) containing poly(3,4-ethylenedioxythiophene) as the main component as a surface layer was coated in a thickness of 4 μm by using a gravure coater to obtain a four-layer sheet of surface layer/electrically conductive layer/substrate layer/electrically conductive layer. The surface resistivity of the surface layer was $7.4 \times 10^{10}$ Ω/□. For the measurement of the surface resistivity, ST-3 surface resistivity measuring apparatus manufactured by SIMCO JAPAN was used.

EXAMPLE 2

Acetylene black (DENKA BLACK particulate, Denki Kagaku Kogyo K.K.) in a proportion of 24 parts by weight based on 100 parts by weight of HIPS (HI-E4, Toyo Styrene K.K.) was measured, and they were uniformly mixed by using a high speed kneading machine, then kneaded by using a ϕ45 mm vent type twin screw extruder, and pelletized by means of a strand cut method to obtain a resin composition to constitute an electrically conductive layer.

Using APT-3010 (an antistatic agent-kneaded resin, Denki Kagaku Kogyo K.K.) for a surface layer, lamination was carried out by means of a feed block method using a ϕ65 mm extruder (L/D=28) and a T die to obtain a three layer sheet of surface layer/electrically conductive layer/surface layer in a layer thickness proportion of 90:120:90 having an entire film thickness of 0.3 mm. In this three-layer sheet, the surface resistivity of the electrically conductive layer was $1.5 \times 10^6$ Ω/□, and the surface resistivity of the surface layer was $6.4 \times 10^{10}$ Ω/□.

A carrier tape was prepared by means of a vacuum drum forming machine so that the surface layer of each of the sheets of Examples 1 and 2 faced inside, i.e. it was to be in contact with an IC, and an IC as an object to be contained was put in a pocket of the carrier tape, and the carrier tape was set to a vibration testing machine and shaken with a vibration width of 50 mm at a number of vibration of 450 rpm for 1 hour, and then left to stand for 24 hours, whereupon breakage condition of the IC due to static electricity was confirmed. As a result of this evaluation, no destruction of IC was confirmed at all in 100 samples.

EXAMPLES 3 to 5

15 Parts by weight of carbon black and 85 parts by weight of an impact resistant polystyrene resin as materials were respectively measured, and they were uniformly mixed by a high speed mixing machine, then kneaded by using a ϕ45 mm vent type twin screw extruder and pelletized by means of a strand cut method to obtain an electrically conductive resin composition. The electrically conductive resin composition was subjected to a ϕ40 mm extruder (L/D=26) to obtain a sheet having a film thickness of 300 μm. The surface resistivity of the sheet was measured to obtain the surface resistivity of the electrically conductive layer.

An acryl resin was coated on one side of the above sheet in a thickness of each of 2, 5 and 10 μm by using a bar coater, and evaluation of electrostatic attenuation and carbon detachment with respect to the coated surface was carried out. The evaluation results are shown in Table 1. In each Example, an antistatic effect was confirmed, and no detachment of carbon black was observed.

TABLE 1

| | Surface layer thickness | Surface resistivity of electrically conductive layer ($\Omega/\square$) | Electrode | Electrostatic attenuation measurement (sec.) Cutoff | | | Sample static electrification voltage (kV) | Carbon detachment |
|---|---|---|---|---|---|---|---|---|
| | | | | 0% | 10% | 50% | | |
| Ex. 3 | 2 μm | $6.2 \times 10^2$ | + | 0.01 | 0.01 | 0.01 | 5 | Nil |
| | | | − | 0.01 | 0.01 | 0.01 | | |
| EX. 4 | 2 μm | $6.0 \times 10^2$ | + | 0.01 | 0.01 | 0.01 | 5 | Nil |
| | | | − | 0.01 | 0.01 | 0.01 | | |
| Ex. 5 | 10 μm | $6.1 \times 10^2$ | + | 0.01 | 0.01 | 0.01 | 5 | Nil |
| | | | − | 0.01 | 0.01 | 0.01 | | |

COMPARATIVE EXAMPLES 1 and 2

In the same manner as in Examples 1 to 5, 15 parts by weight of carbon black and 85 parts by weight of an impact resistant polystyrene resin as materials were respectively measured, and they were uniformly mixed by a high speed mixing machine, then kneaded by using a φ45 mm vent type twin screw extruder and pelletized by means of a strand cut method to obtain an electrically conductive resin composition. This electrically conductive resin composition was subjected to a φ40 mm extruder (L/D=26) to obtain a sheet having a film thickness of 300 μm. The surface resistivity of the sheet was measured to obtain the surface resistivity of the electrically conductive layer.

Evaluation on the electrostatic attenuation and carbon detachment was carried out with respect to the sheet as it was and the sheet one side of which an acryl resin was coated in a thickness of 25 μm by using a bar coater. The evaluation results are shown in Table 2. On the sample on which no acryl resin was coated, detachment of carbon black was confirmed, and on the sample on which the acryl resin was coated in a thickness of 25 μm, no adequate antistatic effect was obtained.

Examples wherein the Surface Layer Has a Composition Close to an Electronic Component in the Series of Frictional Electrification In the following Examples, a composition close to an electronic component in the series of static electrification was used as a surface layer. With respect to the static electrification charge amount, the static electrification charge amount of an electronic component was measured by using a Nano Coulomb meter and a Faraday cage manufactured by Electro-Tech System. As an ionizer, AEROSTAT PC manufactured by SIMCO JAPAN was used. As a shaker, Cute Mixer manufactured by Tokyo Rika Kikai K.K. was used.

EXAMPLE 6

20 Parts by weight of carbon black (manufactured by Denki Kagaku Kogyo K.K., tradename: DENKA ACETYLENE BLACK), 70 parts by weight of HIPS (manufactured by Toyo Styrene K.K., tradename: TOYO STYROL HI-U2-301U) and 10 parts by weight of a styrene type elastomer (manufactured by JSR Corporation, tradename: TR2003) as materials were respectively measured, and they were uniformly mixed by a tumbler, then kneaded by using a φ45 mm

TABLE 2

| | Surface layer thickness | Surface resistivity of electrically conductive layer $\Omega/\square$ | Electrode | Electrostatic attenuation measurement (sec.) Cutoff | | | Sample static electrification voltage (kV) | Carbon detachment |
|---|---|---|---|---|---|---|---|---|
| | | | | 0% | 10% | 50% | | |
| Comp. Ex. 1 | 0 μm | $6.0 \times 10^2$ | + | 0.01 | 0.01 | 0.01 | 5 | Observed |
| | | | − | 0.01 | 0.01 | 0.01 | | |
| Comp. Ex. 2 | 25 μm | $6.1 \times 10^2$ | + | >60 | >60 | >60 | 5 | Nil |
| | | | − | >60 | >60 | >60 | | |

Evaluation Method

The electrostatic attenuation was obtained in accordance with FTMS-101C in such a manner that 5000 V was applied to each sample, and then times when the differences in potential were 2500 V (50%), 500 V (10%) and 0V (0%), respectively, were measured.

Carbon detachment was evaluated in such a manner that an IC of QFP 14 mm×20 mm/64 pin was reciprocated on the surface of each of the sheets and a plate sample with a stroke of 15 mm for 100 back-and-forth motions, then the lead portion of the IC was observed by a microscope, and the carbon detachment was evaluated by presence or absence of black substances such as carbon black on the lead portion.

co-rotating twin screw extruder manufactured by Ikegai Corporation, and strands were cut by a pelletizer to prepare a compound A to be an electrically conductive layer. The compound A was fusion-kneaded again by a single axis extruder, and a sheet having a thickness of 0.2 mm was prepared by a T-die. The surface resistivity of the sheet was $10^4$ $\Omega/\square$.

On the other hand, as a resin to constitute a surface layer, 75 parts by weight of a vinylidene fluoride polymer (manufactured by KYNAR, tradename: 720) and 25 parts by weight of polymethyl methacrylate (manufactured by Mitsubishi Rayon Co., Ltd., tradename: ACRYPET G) as an acrylate type polymer were blended by a tumbler, and extruded by fusion-kneading with a ϕ45 mm co-rotating twin screw extruder manufactured by Ikegai Corporation to prepare a compound B. The compound B was fusion-kneaded again by a single axis extruder, and a film having a thickness of 30 μm was prepared by a T-die.

The film was attached to a slope at an angle of 30 degrees with a slope length of 30 cm as illustrated in FIG. 1, and the film charge was removed by spraying ionized air on the film surface. Then, the charge of an IC (MQFP type 28 mm square) to be an electronic component was removed by using ionized air similarly, and the IC was slid down and the static electrification charge amount of the IC was measured, whereupon it was 0.02 nC.

The compound A and the compound B were laminated by means of a feed block method by using two ϕ45 mm extruders and then extruded from a T-die, to obtain a three-layer sheet with a constitution of surface layer/electrically conductive layer/surface layer, having an entire thickness of 0.3 mm and a thickness of the surface layer comprising the compound B on each side of the sheet of 15 μm. The surface resistivity of the sheet was at least $10^{12}$ Ω/□.

The sheet was prepared into a carrier tape shape by a vacuum forming machine so that the surface layer faced inside, i.e. it was to be in contact with an IC, and an IC as an object to be contained was put in a pocket of the carrier tape, and the carrier tape was set to a shaker and shaken at 700 rpm for 1 hour. Then, destruction state of the IC was confirmed by an open/short tester (manufactured by Tokyo Electronics Trading Co., Ltd.). As a result of this evaluation, no destruction of the IC was confirmed.

EXAMPLE 7

20 Parts by weight of carbon black (manufactured by Denki Kagaku Kogyo K.K., tradename: DENKA ACETYLENE BLACK), 70 parts by weight of a high-impact polystyrene (manufactured by Toyo Styrene K.K., tradename: TOYO STYROL HI-U2-301U) and 10 parts by weight of a styrene type elastomer (manufactured by JSR Corporation, tradename: TR2003) as materials were respectively measured, and they were uniformly mixed by a tumbler, then kneaded by using a ϕ45 mm co-rotating twin screw extruder manufactured by Ikegai Corporation, and strands were cut by a pelletizer to prepare a compound A to be an electrically conductive layer. The compound A was fusion-kneaded again by a single axis extruder, and a sheet having a thickness of 0.2 mm was prepared by a T-die. The surface resistivity of the sheet was $10^4$ Ω/□.

On the other hand, as a resin to constitute a surface layer, 85 parts by weight of an ABS resin (manufactured by Denki Kagaku Kogyo K.K., tradename: DENKA ABS) and 15 parts by weight of a durable antistatic agent (manufactured by Sanyo Chemical Industries, Ltd., tradename: PELESTAT NC6321) were blended by a tumbler, and extruded by fusion-kneading with a ϕ45 mm co-rotating twin screw extruder manufactured by Ikegai Corporation to prepare a compound C. The compound C was fusion-kneaded again by a single axis extruder, and a film having a thickness of 30 μm was prepared by a T-die. The film was attached to a slope at an angle of 30 degrees with a slope length of 30 cm as illustrated in FIG. 1, and the film charge was removed by spraying ionized air on the film surface. Then, the charge of an IC (MQFP type 28 mm square) to be an electronic component was removed by using ionized air similarly, and the IC was slid down and the static electrification charge amount of the IC was measured, whereupon it was −0.16 nC.

The compound A and the compound C were laminated by a feed block method by using two ϕ45 mm extruders and then extruded from a T-die, to obtain a three-layer sheet with a constitution of surface layer/electrically conductive layer/surface layer, having an entire thickness of 0.3 mm and a thickness of the surface layer comprising the compound C on each side of the sheet of 15 μm. The surface resistivity of the surface layer of the sheet was $100^{11}$ Ω/□.

The sheet was prepared into a carrier tape shape by a vacuum forming machine so that the surface layer faced inside, i.e. it was to be in contact with an IC, and an IC as an object to be contained was put in a pocket of the carrier tape, and the carrier tape was set to a shaker and shaken at 700 rpm for 1 hour. Then, destruction state of the IC was confirmed by an open/short tester (manufactured by Tokyo Electronics Trading Co., Ltd.). As a result of this evaluation, no destruction of the IC was confirmed.

EXAMPLE 8

22 Parts by weight of carbon black (manufactured by Denki Kagaku Kogyo K.K., tradename: DENKA ACETYLENE BLACK) and 78 parts by weight of a low density polyethylene (manufactured by Nippon Polychem, tradename: NOVATEC LC621) as materials were respectively measured, and they were uniformly mixed by a tumbler, then kneaded by using a ϕ45 mm co-rotating twin screw extruder manufactured by Ikegai Corporation, and strands were cut by a pelletizer to prepare a compound D to be an electrically conductive layer. The compound D was fusion-kneaded again by a single axis extruder, and a sheet having a thickness of 0.25 mm was prepared by a T-die. The surface resistivity of the sheet was $10^5$ Ω/□.

On the other hand, as a resin to constitute a surface layer, 83 parts by weight of a low density polyethylene resin (manufactured by Nippon Polychem, tradename: NOVATEC LC621) and 17 parts by weight of a durable antistatic agent (manufactured by Sanyo Chemical Industries, Ltd., tradename: PELESTAT 300) were blended by a tumbler, and extruded by fusion-kneading with a ϕ45 mm co-rotating twin screw extruder manufactured by Ikegai Corporation to prepare a compound E. The compound E was fusion-kneaded again by a single axis extruder, and a film having a thickness of 30 μm was prepared by a T-die. The film was attached to a slope at an angle of 30 degrees with a slope length of 30 cm as illustrated in FIG. 1, and the film charge was removed by spraying ionized air on the film surface. Then, the charge of an IC (MQFP type 28 mm square) to be an electronic component was removed by using ionized air similarly, and the IC was slid down and the static electrification charge amount of the IC was measured, whereupon it was −0.39 nC.

The compound D and the compound E were laminated by means of a feed block method by using two ϕ45 mm extruders and then extruded from a T-die, to obtain a three-layer sheet with a constitution of surface layer/electrically conductive layer/surface layer, having an entire thickness of 0.3 mm and a thickness of the surface layer comprising the compound E on each side of the sheet of 20 μm. The surface resistivity of the surface layer of the sheet was $10^{10}$ Ω/□.

The sheet was prepared into a carrier tape shape by a vacuum forming machine so that the surface layer faced inside, i.e. it was to be in contact with an IC, and an IC as an object to be contained was put in a pocket of the carrier tape, and the carrier tape was set to a shaker and shaken at 700 rpm for 1 hour. Then, destruction state of the IC was confirmed by an open/short tester (manufactured by Tokyo Electronics Trading Co., Ltd.). As a result of this evaluation, no destruction of the IC was confirmed.

EXAMPLE 9

22 Parts by weight of carbon black (manufactured by Denki Kagaku Kogyo K.K., tradename: DENKA ACETYLENE BLACK) and 78 parts by weight of a polycarbonate resin (manufactured by Teijin Chemicals Ltd., tradename: Panlite L1225) as materials were respectively measured, and they were uniformly mixed by a tumbler and then kneaded by using a φ45 mm co-rotating twin screw extruder manufactured by Ikegai Corporation, and strands were cut by a pelletizer to prepare a compound F to be an electrically conductive layer. The compound F was fusion-kneaded again by a single axis extruder, and a sheet having a thickness of 0.25 mm was prepared by a T-die. The surface resistivity of the sheet was $10^5$ Ω/□.

On the other hand, as a resin to constitute the surface layer, 25 parts by weight of a polycarbonate resin (manufactured by Teijin Chemicals Ltd., tradename: Panlite L1225) and 75 parts by weight of an ABS resin (manufactured by Denki Kagaku Kogyo K.K., tradename: DENKA ABS) were blended by a tumbler, and extruded by fusion-kneading with a φ45 mm co-rotating twin screw extruder manufactured by Ikegai Corporation to prepare a compound E. The compound E was fusion-kneaded again by a single axis extruder, and a film having a thickness of 25 μm was prepared by a T-die. The film was attached to a slope at an angle of 30 degrees with a slope length of 30 cm as illustrated in FIG. 1, and the film charge was removed by spraying ionized air on the film surface. Then, the charge of an IC (MQFP type 28 mm square) to be an electronic component was removed by using ionized air similarly, and the IC was slid down to measure the static electrification charge amount of the IC, whereupon it was 0.19 nC.

The compound F and the compound G were extruded from a multi-manifold die by using two φ45 mm extruders to obtain a three-layer sheet with a constitution of surface layer/electrically conductive layer/surface layer having an entire thickness of 0.3 mm and a thickness of the surface layer comprising the compound G on each side of the sheet of 20 μm. The surface resistivity of the surface layer of the sheet was at least $10^{12}$ Ω/□.

The sheet was prepared into a carrier tape shape by a vacuum forming machine so that the surface layer faced inside i.e. it was to be in contact with an IC, and an IC as an object to be contained was put in a pocket of the carrier tape, and the carrier tape was set to a shaker, and shaken at 700 rpm for 1 hour. Then, destruction state of the IC was confirmed by an open/short tester (manufactured by Tokyo Electronics Trading Co., Ltd.). As a result of this evaluation, no destruction of the IC was confirmed.

EXAMPLE 10

20 Parts by weight of carbon black (manufactured by Denki Kagaku Kogyo K.K., tradename: DENKA ACETYLENE BLACK), 70 parts by weight of a high-impact polystyrene (manufactured by Toyo Styrene K.K., tradename: TOYO STYROL HI-U2-301U) and 10 parts by weight of a styrene type elastomer (manufactured by JSR Corporation, tradename: TR2003) as materials were respectively measured, and they were uniformly mixed by a tumbler and then kneaded by a φ45 mm co-rotating twin screw extruder manufactured by Ikegai Corporation, and strands were cut by a pelletizer to prepare a compound A to be an electrically conductive layer. The compound A was fusion-kneaded again by a single axis extruder, and a sheet having a thickness of 0.25 mm was prepared by a T-die. The surface resistivity of the sheet was $10^4$ Ω/□.

On the other hand, as a resin to constitute the surface layer, a graft copolymer resin comprising polyethylene as the main chain and polystyrene as the side chain (manufactured by NOF Corporation, tradename: MODIPER A1100 was used. This resin H to constitute a surface layer was fusion-kneading with a single axis extruder, and a film having a thickness of 25 μm was prepared by a T-die. The film was attached to a slope at an angle of 30 degrees with a slope length of 30 cm as illustrated in FIG. 1, and the film charge was removed by spraying ionized air on the film surface. Then, the charge of an IC (MQFP type 28 mm square) to be an electronic component was removed by using ionized air similarly, and the IC was slid down to measure the static electrification charge amount of the IC, whereupon it was 0.24 nC.

The compound A and the compound H were extruded from a multi-manifold die by using two φ45 mm extruders to obtain a three-layer sheet with a constitution of surface layer/electrically conductive layer/surface layer having an entire thickness of 0.3 mm and a thickness of the surface layer comprising the compound H on each side of the sheet of 10 μm. The surface resistivity of the surface layer of the sheet was at least $10^{12}$ Ω/□.

The sheet was prepared into a carrier tape shape by a vacuum forming machine so that the surface layer faced inside i.e. it was to be in contact with an IC, and an IC as an object to be contained was put in a pocket on the carrier tape, and the carrier tape was set to a shaker and shaken at 700 rpm for 1 hour. Then, destruction state of the IC was confirmed by an open/short tester (manufactured by Tokyo Electronics Trading Co., Ltd.). As a result of this evaluation, no destruction of the IC was confirmed.

COMPARATIVE EXAMPLE 3

For a comparison with Examples 6 and 7, the same operation was carried out except that as the surface layer, a composition comprising 22 parts by weight of carbon black, 78 parts by weight of a high-impact polystyrene and 10 parts by weight of a styrene type elastomer was used to obtain a resin having a surface resistivity of the surface layer of $10^4$ Ω/□. As shown in Table 3, the destruction state of the IC was confirmed by an open/short tester, whereupon destruction of IC took place.

TABLE 3

|  | Ex. 6 | Ex. 7 | Ex. 8 | Ex. 9 | Ex. 10 | Comp. Ex. 3 |
|---|---|---|---|---|---|---|
| Composition of electrically conductive layer | CB:20 HIPS:70 SE:10 | CB:20 HIPS:70 SE:10 | CB:22 LDPE:78 | CB:22 PC:78 | CB:20 HIPS:70 SE:10 | CB:20 HIPS:70 SE:10 |

TABLE 3-continued

|  | Ex. 6 | Ex. 7 | Ex. 8 | Ex. 9 | Ex. 10 | Comp. Ex. 3 |
|---|---|---|---|---|---|---|
| Surface resistivity of electrically conductive layer | $10^4 \Omega/\square$ | $10^4 \Omega/\square$ | $10^5 \Omega/\square$ | $10^5 \Omega/\square$ | $10^4 \Omega/\square$ | $10^4 \Omega/\square$ |
| Composition of surface layer | PVDF:75 PMMA:25 | ABS:85 ASA:15 | LDPE:83 ASA:17 | PC:25 ABS:75 | PE-PS:100 | CB:20 HIPS:70 SE: 10 |
| Static electrification charge amount of IC | 0.02 nC | −0.16 nC | −0.39 nC | 0.19 nC | 0.24 nC | 0.90 nC |
| Thickness of the entire sheet | 0.30 mm | 0.30 mm | 0.30 mm | 0.30 mm | 0.30 mm | 0.30 mm |
| Thickness of sheet surface layer | 15 μm | 15 μm | 20 μm | 20 μm | 10 μm | 15 μm |
| Surface resistivity of sheet | $10^{12} \Omega/\square \leq$ | $10^{11} \Omega/\square \leq$ | $10^{10} \Omega/\square \leq$ | $10^{12} \Omega/\square \leq$ | $10^{12} \Omega/\square \leq$ | $10^4 \Omega/\square$ |
| IC destruction | Nil | Nil | Nil | Nil | Nil | Observed |

Symbols used in Table 3 are shown below.
CB: Carbon black
HIPS: High-impact polystyrene
PC: Polycarbonate
SE: Styrene type elastomer
LDPE: Low density polyethylene
ASA: Durable antistatic agent
PMMA: Polymethyl methacrylate
PVDF: Polyvinylidene fluoride
PE-PS: Graft polymer comprising polyethylene as the main chain and polystyrene as the side chain Industrial Applicability According to the present invention, an injection tray, a vacuum-formed tray, a magazine, a carrier tape (embossed carrier tape), etc., as an electronic component packaging container for e.g. an IC, can effectively protect an electronic component from static electricity impairment due to static electricity generated in the process of transporting or storing the electronic component. Particularly, the present invention is also effective against static electricity impairment of an electronic component which is highly integrated, the wiring of which becomes fine, and which is very susceptible to static electricity destruction.

what is claimed is:

1. A sheet, which comprises:
   a continuous layer comprising thermoplastic resin and an electrically conductive filler having a surface resistivity of from $10^2$ to $10^{12}$ $\Omega/\square$, and
   a surface layer having a surface resistivity of from $10^9$ to $10^{14}$ $\Omega/\square$ formed on both sides or on one side of said continuous layer;
   wherein the surface resistivity of the surface layer is higher than the surface resistivity of the continuous layer.

2. The sheet according to claim 1, wherein a substrate layer is further laminated on the continuous layer having a structure of surface layer/continuous layer/substrate layer.

3. The sheet according to claim 1, wherein a substrate layer is further laminated on the continuous layer with a structure of surface layer/continuous layer/substrate layer/continuous layer/surface layer.

4. The sheet according to claim 1, wherein the surface layer comprises a material which is close to an electronic component to be contained in the sheet using said surface layer, in the series of frictional electrification.

5. The sheet according to claim 4, wherein the surface layer comprises an acrylate type polymer and polyvinylidene fluoride.

6. The sheet according to claim 4, wherein the surface layer comprises an olefin type polymer and an aromatic vinyl compound type polymer.

7. The sheet according to claim 4, wherein the surface layer comprises a mixture of polycarbonate and a copolymer of acrylonitrile and an aromatic vinyl compound.

8. An electronic component packaging container which comprises the sheet as defined in claim 1.

9. A carrier tape which comprises the sheet as defined in claim 1.

10. A method of protecting an electronic component from static electricity impairment due to static electricity, which comprises:
    enclosing the electronic component with the sheet as claimed in claim 1 and
    transporting or storing the enclosed sheet comprising the electronic component.

11. The sheet according to claim 1, wherein the continuous layer has a surface resistivity of from $10^4$ to $10^8$ $\Omega/\square$.

12. The sheet according to claim 1, wherein the continuous layer has a surface resistivity of from $10^4$ to $10^8$ $\Omega/\square$.

13. A sheet, which comprises:
    a continuous layer comprising thermoplastic resin and an electrically conductive filler having a surface resistivity of from $10^2$ to $10^{12}$ $\Omega/\square$, and a surface layer having a thickness of at most 20 μm and comprising a thermoplastic resin formed on both sides or on one side of said continuous layer; wherein the surface resistivity of the surface layer is higher than the surface resistivity of the continuous layer.

14. The sheet according to claim 13, wherein a substrate layer is further laminated on the continuous layer with a structure of surface layer/continuous layer/substrate layer.

15. The sheet according to claim 13, wherein a substrate layer is further laminated on the continuous layer with a structure of surface layer/continuous layer/substrate layer/continuous layer/surface layer.

16. The sheet according to claim 13, wherein the surface layer comprises a material which is close to an electronic component to be contained in the sheet using said surface layer, in the series of frictional electrification.

17. The sheet according to claim 16, wherein the surface layer comprises an acrylate type polymer and polyvinylidene fluoride.

18. The sheet according to claim 16, wherein the surface layer comprises an olefin type polymer and an aromatic vinyl compound type polymer.

19. The sheet according to claim 16, wherein the surface layer comprises a mixture of polycarbonate and a copolymer of acrylonitrile and an aromatic vinyl compound.

20. An electronic compound packaging container which comprises the sheet as defined in claim 13.

21. A carrier tape which comprises the sheet as defined in claim 13.

22. A method of protecting an electronic component from static electricity impairment due to static electricity, which comprises:

enclosing the electronic component with the sheet as claimed in claim 13 and transporting or storing the enclosed sheet comprising the electronic component.

23. The sheet according to claim 13, wherein the surface layer has a thickness of 0.1 to 20 μm.

24. The sheet according to claim 13, wherein the surface layer has a thickness selected from the group consisting of 2 μm, 5 μm, and 10 μm.

* * * * *